(12) United States Patent
Stoyles et al.

(10) Patent No.: US 11,227,494 B1
(45) Date of Patent: Jan. 18, 2022

(54) PROVIDING TRANSIT INFORMATION IN AN AUGMENTED REALITY ENVIRONMENT

(71) Applicant: Apple Inc., Cupertino, CA (US)

(72) Inventors: Justin D. Stoyles, San Francisco, CA (US); Michael Kuhn, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/140,211

(22) Filed: Sep. 24, 2018

Related U.S. Application Data

(60) Provisional application No. 62/565,762, filed on Sep. 29, 2017.

(51) Int. Cl.
| | |
|---|---|
| G08G 1/13 | (2006.01) |
| G08G 1/137 | (2006.01) |
| G06T 19/00 | (2011.01) |
| G01C 21/36 | (2006.01) |

(52) U.S. Cl.
CPC ............ *G08G 1/137* (2013.01); *G01C 21/362* (2013.01); *G01C 21/3602* (2013.01); *G01C 21/365* (2013.01); *G01C 21/3647* (2013.01); *G06T 19/006* (2013.01)

(58) Field of Classification Search
CPC ................ G08G 1/137; G01C 21/3602; G01C 21/3647; G01C 21/362; G01C 21/365; G06T 19/006
See application file for complete search history.

(56) References Cited

U.S. PATENT DOCUMENTS

| | | | | |
|---|---|---|---|---|
| 9,541,407 | B1 * | 1/2017 | Mohler | ................... H04W 4/90 |
| 2017/0039765 | A1 * | 2/2017 | Zhou | ......................... G06T 7/55 |
| 2017/0365097 | A1 * | 12/2017 | Lim | ....................... G06T 19/006 |
| 2018/0066956 | A1 * | 3/2018 | Kim | .................... G01C 21/3682 |
| 2018/0350144 | A1 * | 12/2018 | Rathod | ................. H04W 4/029 |
| 2019/0084670 | A1 * | 3/2019 | Sharma | ................. B64C 39/024 |

* cited by examiner

*Primary Examiner* — Nader Bolourchi
(74) *Attorney, Agent, or Firm* — Dentons US LLP

(57) ABSTRACT

The present disclosure relates to providing transit information in an augmented reality environment. In some embodiments, images are obtained using one or more image sensors, a determination is made whether the obtained images include a map, and, in accordance with a set of one or more conditions being satisfied, transit information is displayed in the augmented reality environment. A location of the displayed transit information in the augmented reality environment may correspond to a respective feature of the map.

22 Claims, 12 Drawing Sheets

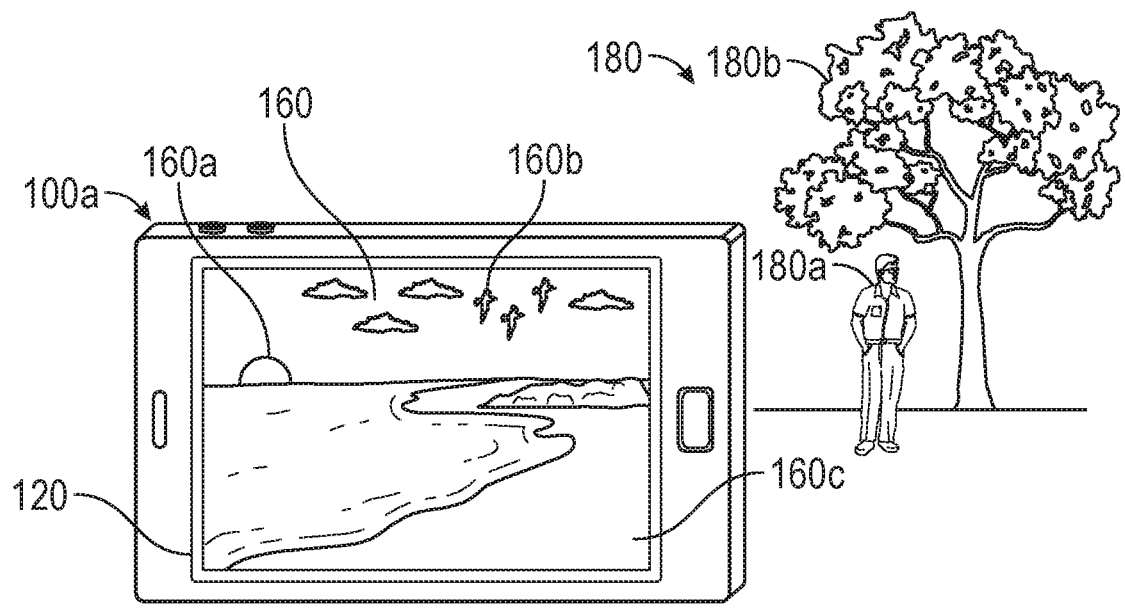
FIG. 1C   Virtual Reality
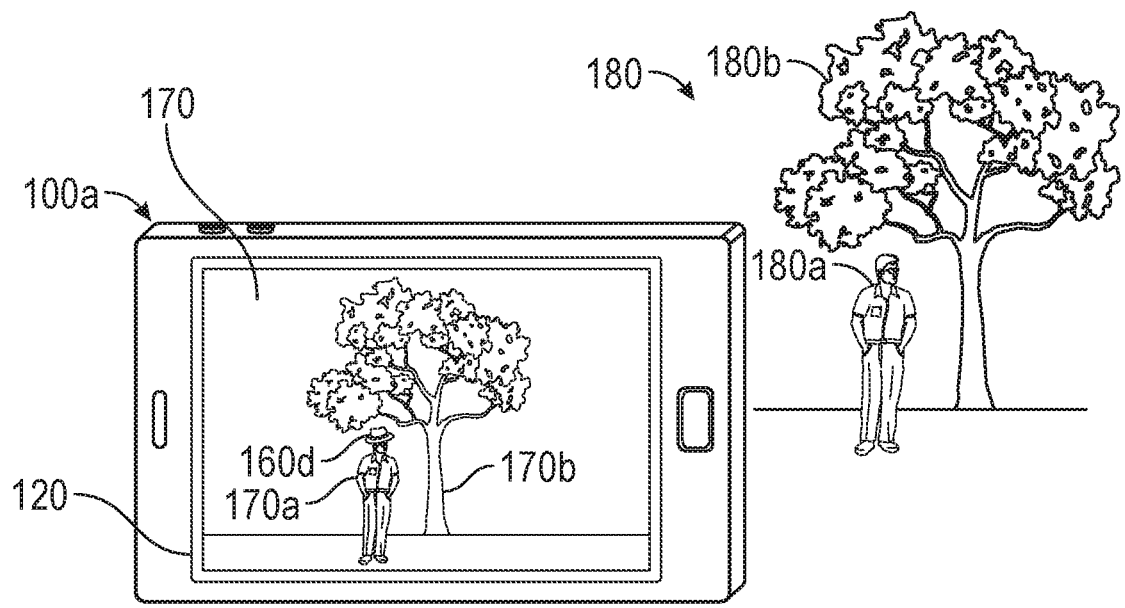
FIG. 1D   Augmented Reality (pass-through video)

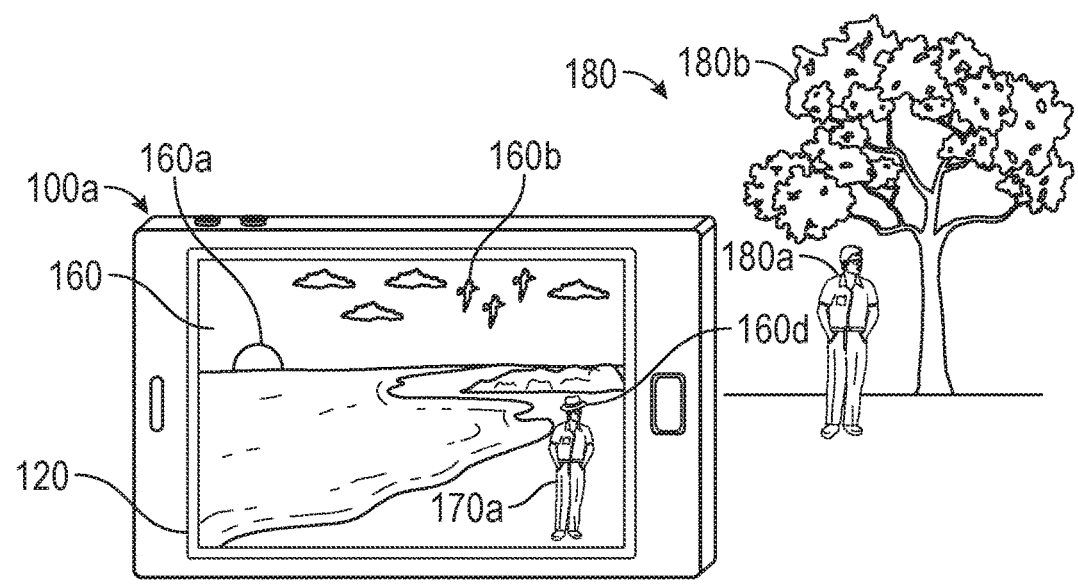
FIG. 1E  Augmented Virtuality
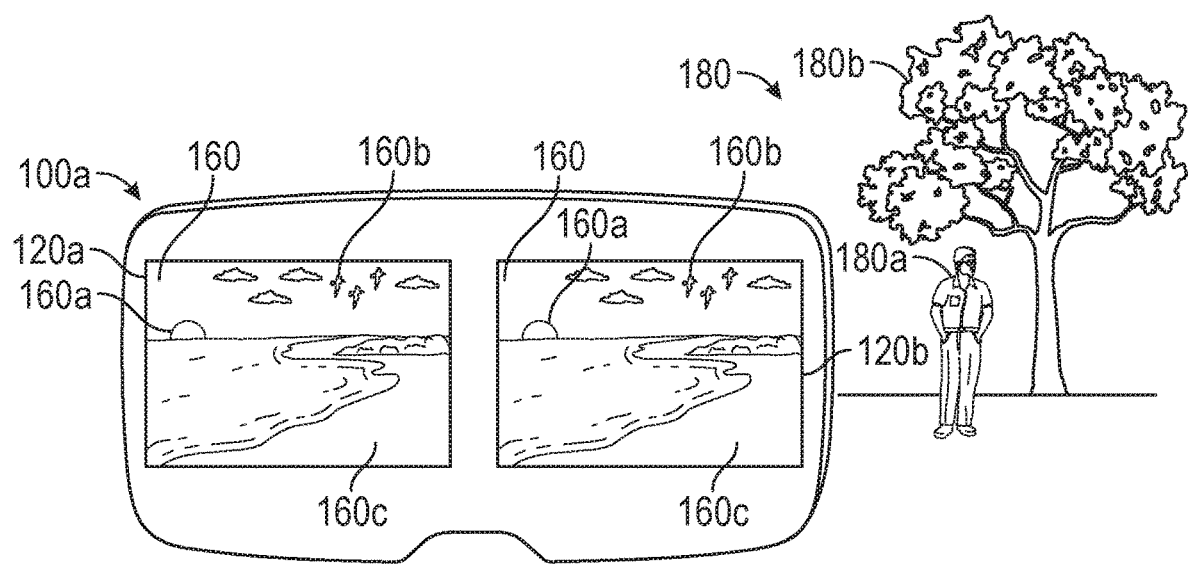
FIG. 1F  Virtual Reality

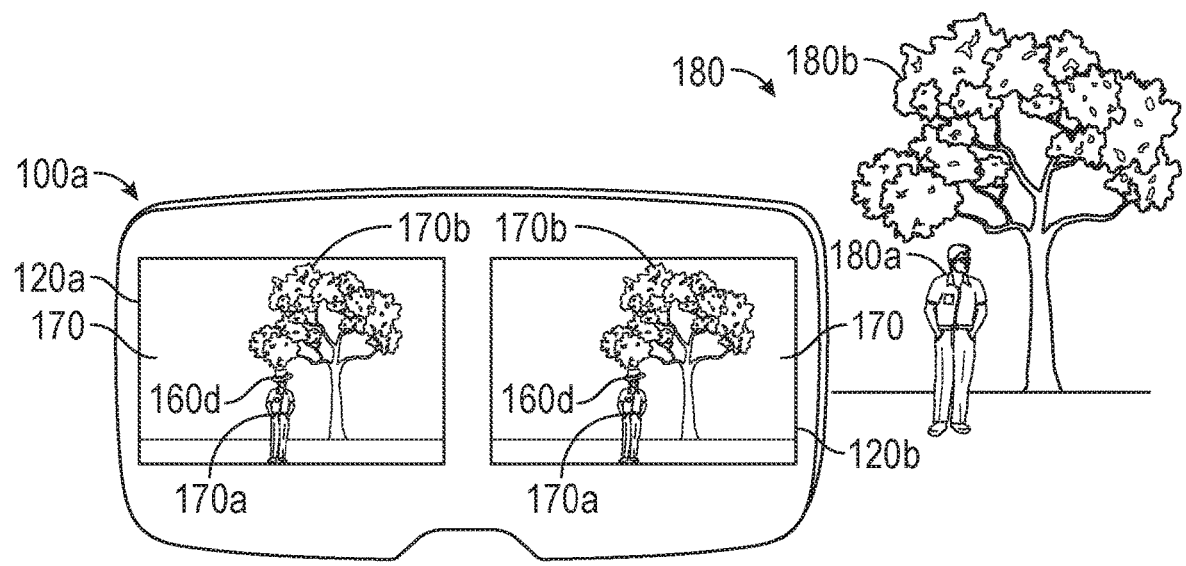
FIG. 1G  Augmented Reality (pass-through video)
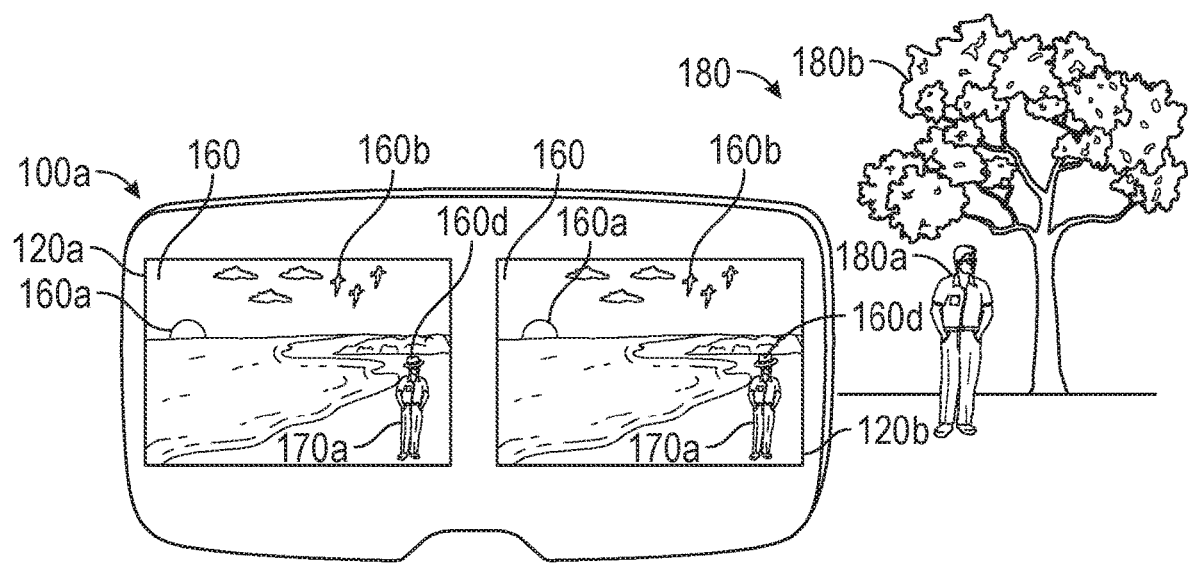
FIG. 1H  Augmented Virtuality

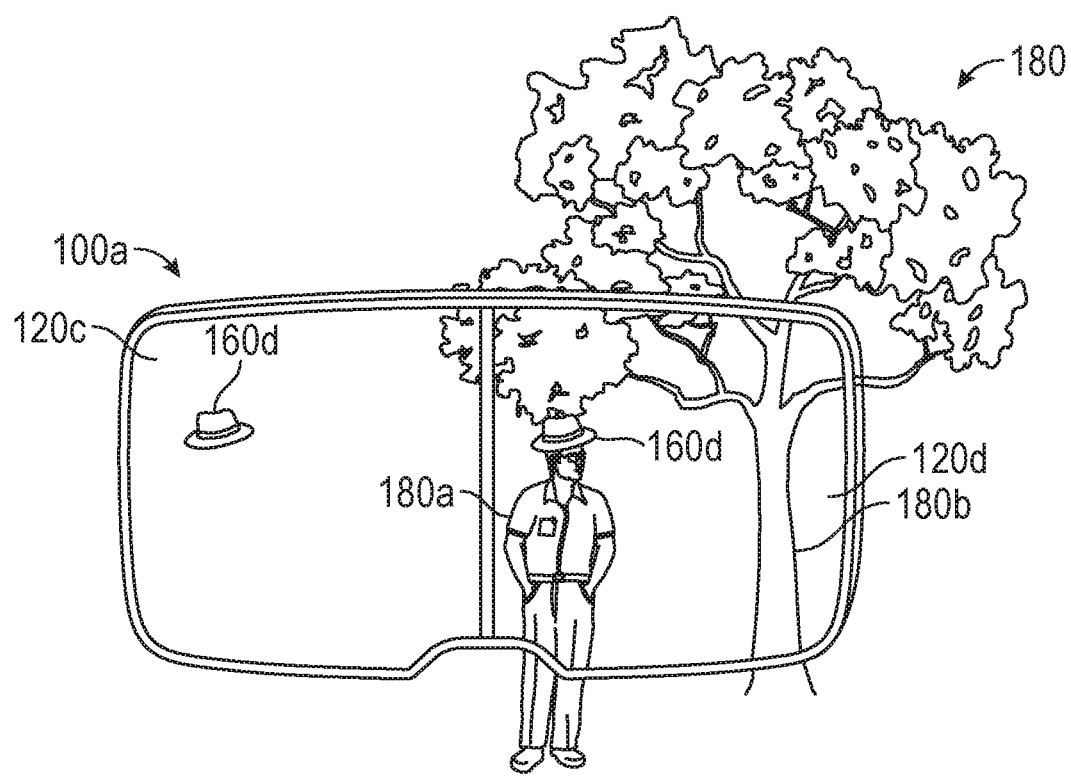
FIG. 1I     Augmented Reality (heads-up display)

PROVIDING TRANSIT INFORMATION IN AN AUGMENTED REALITY ENVIRONMENT

CROSS-REFERENCE TO RELATED APPLICATIONS

This application claims the benefit of U.S. Provisional Patent Application No. 62/565,762, entitled "PROVIDING TRANSIT INFORMATION IN AN AUGMENTED REALITY ENVIRONMENT," filed on Sep. 29, 2017, which is hereby incorporated by reference in its entirety.

TECHNICAL FIELD

The present disclosure relates generally to augmented reality environments, and more specifically to providing transit information in augmented reality environments.

BACKGROUND

A transit map is an example of a map. Transit maps typically illustrate routes and stations within a transit system such as a train system. Transit maps are illustrated using different languages depending on location.

SUMMARY

Described herein are techniques for providing transit information in an augmented reality environment. In some embodiments, a technique includes obtaining images using one or more image sensors; determining whether the obtained images include a map; in accordance with a set of one or more conditions being satisfied, the set of one or more conditions including a first condition that is satisfied when the obtained images include the map, displaying transit information in the augmented reality environment, wherein a location of the displayed transit information in the augmented reality environment corresponds to a respective feature of the map.

In some embodiments, the set of one or more conditions include a second condition that is satisfied when the map corresponds to a predefined map. In some embodiments, the set of one or more conditions include a third condition that is satisfied when an element in the augmented reality environment is activated by a user. In some embodiments, in accordance with the set of one or more conditions being satisfied, the technique includes retrieving at least a portion of the transit information from one or more external data sources. In some embodiments, the technique includes determining a physical location of an electronic device, wherein the displayed transit information is based at least in part on the physical location of the electronic device. In some embodiments, the technique includes retrieving at least a portion of the transit information from one or more external data resources based at least in part on the physical location of the electronic device. In some embodiments, the technique includes receiving input representing an intended destination, wherein the displayed transit information is based at least in part on the intended destination.

In some embodiments, the transit information includes a current location of a transit vehicle, a route to a destination, an estimated time of arrival of a transit vehicle, an estimated time of departure of a transit vehicle, a translation of map text, a price of transit, or a combination thereof. In some embodiments, the map is a public transit map.

In some embodiments, a device for providing transit information in an augmented reality environment includes one or more processors and memory storing one or more programs configured to be executed by the one or more processors. The one or more programs include instructions for obtaining images using one or more image sensors; determining whether the obtained images include a map; in accordance with a set of one or more conditions being satisfied, the set of one or more conditions including a first condition that is satisfied when the obtained images include the map, displaying transit information in the augmented reality environment, wherein a location of the displayed transit information in the augmented reality environment corresponds to a respective feature of the map.

In some embodiments, a non-transitory (or, optionally, transitory) computer-readable storage medium storing one or more programs configured to be executed by one or more processors provides the transit information in the augmented reality environment. The one or more programs include instructions for obtaining images using one or more image sensors; determining whether the obtained images include a map; in accordance with a set of one or more conditions being satisfied, the set of one or more conditions including a first condition that is satisfied when the obtained images include the map, displaying transit information in the augmented reality environment, wherein a location of the displayed transit information in the augmented reality environment corresponds to a respective feature of the map.

BRIEF DESCRIPTION OF THE DRAWINGS

In the following description, reference is made to the accompanying drawings which form a part thereof, and which illustrate several embodiments of the present disclosure. It is understood that other embodiments may be utilized and structural and operational changes may be made without departing from the scope of the present disclosure. The use of the same reference symbols in different drawings indicates similar or identical items.

FIGS. 1C-1E illustrate embodiments of the system in the form of mobile devices.

FIGS. 1F-1H illustrate embodiments of the system in the form of head-mounted display devices.

FIG. 1I illustrates an embodiment of the system in the form of a head-up display device.

DETAILED DESCRIPTION

Figure 1A:
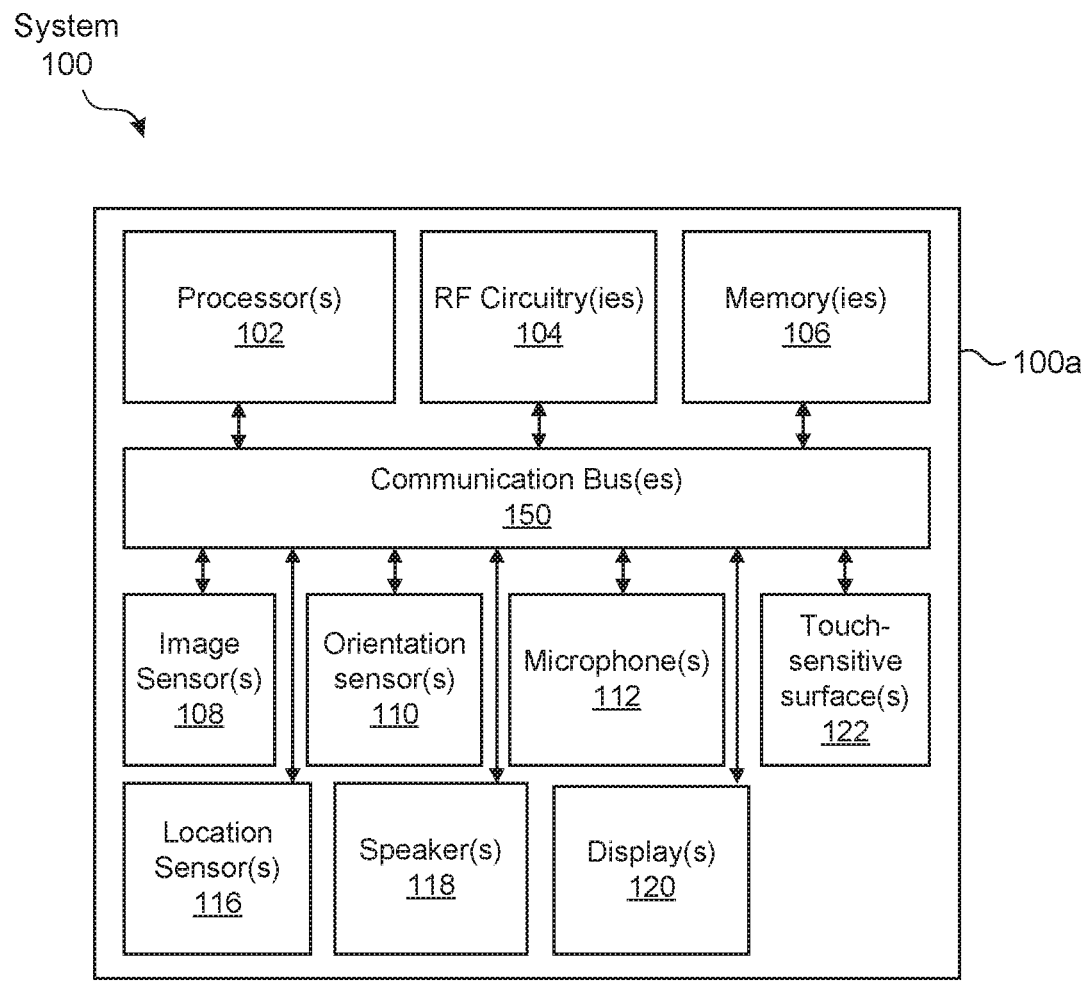
FIGS. 1A-1B depict exemplary systems for use in various computer-generated reality technologies, including virtual reality and mixed reality.

Various embodiments of electronic systems and techniques for using such systems in relation to various computer-generated reality technologies, including virtual reality and mixed reality (which incorporates sensory inputs from a physical environment), are described. In particular, the present disclosure provides techniques for providing transit information in an augmented reality environment. A physical map (e.g., a transit map located at a transit station) is identified, and then additional transit information associated with the map is displayed in the augmented reality environment. In some embodiments, the transit information is displayed in the augmented reality environment such that the information appears to overlay the physical map. In this way, updated transit information, and/or transit information of relevance to the user, is provided along with the physical map.

A physical environment (or real environment) refers to a physical world that people can sense and/or interact with without aid of electronic systems. Physical environments, such as a physical park, include physical articles (or physical objects or real objects), such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment (or virtual environment) refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
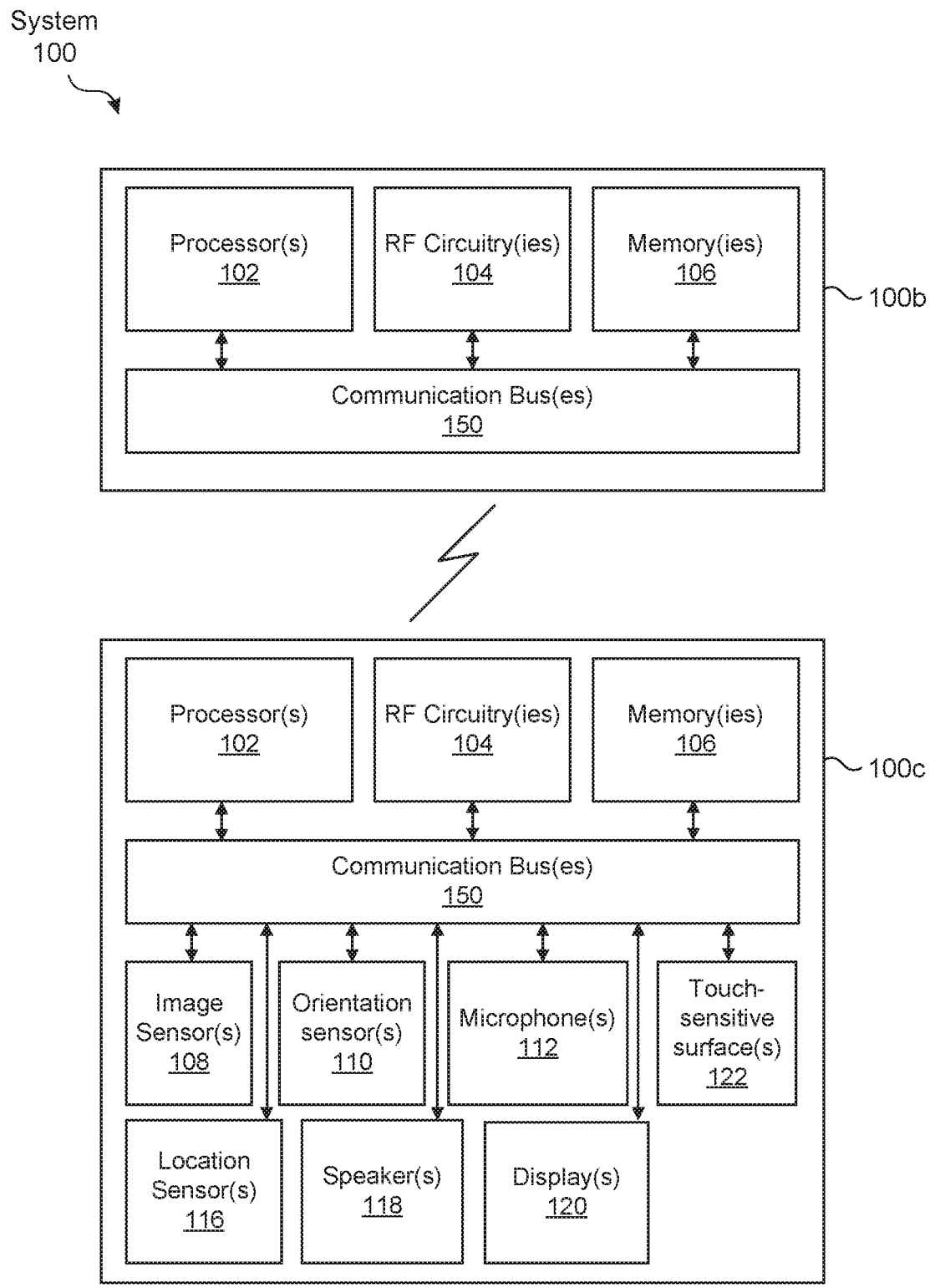

FIG. 1A and FIG. 1B depict exemplary system 100 for use in various computer-generated reality technologies, including virtual reality and mixed reality.

In some embodiments, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some embodiments, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100a is implemented in a base station device or a HMD device.

As illustrated in FIG. 1B, in some embodiments, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

In some embodiments, system 100 is a mobile device, such as in the embodiments described with respect to device 100a in FIGS. 1C-1E. In some embodiments, system 100 is a head-mounted display (HMD) device, such as in the embodiments described with respect to device 100a in FIGS. 1F-1H. In some embodiments, system 100 is a wearable HUD device, such as in the embodiments described with respect to device 100a in FIG. H.

System 100 includes processor(s) 102 and memory(ies) 106. Processor(s) 102 include one or more general processors, one or more graphics processors, and/or one or more digital signal processors. In some embodiments, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some examples, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some examples, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some embodiments, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical objects in the real environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some embodiments, system 100 includes microphones(s) 112. System 100 uses microphone(s) 112 to detect sound from the user and/or the real environment of the user. In some examples, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

FIGS. 1C-1E illustrate examples of system 100 in the form of device 100*a*. In FIGS. 1C-1E, device 100*a* is a mobile device, such as a cellular phone. FIG. 1C illustrates device 100*a* carrying out a virtual reality technique. Device 100*a* is displaying, on display 120, a virtual environment 160 that includes virtual objects, such as sun 160*a*, birds 160*b*, and beach 160*c*. Both the displayed virtual environment 160 and virtual objects (e.g., 160*a*, 160*b*, 160*c*) of the virtual environment 160 are computer-generated imagery. Note that the virtual reality environment depicted in FIG. 1C does not include representations of physical objects from the real environment 180, such as physical person 180*a* and physical tree 180*b*, even though these elements of real environment 180 are within the field of view of image sensor(s) 108 of device 100*a*.

FIG. 1D illustrates device 100*a* carrying out a mixed reality technique, and in particular an augmented reality technique, using pass-through video. Device 100*a* is displaying, on display 120, a representation 170 of the real environment 180 with virtual objects. The representation 170 of the real environment 180 includes representation 170*a* of person 180*a* and representation 170*b* of tree 180*b*. For example, the device uses image sensor(s) 108 to capture images of the real environment 180 that are passed through for display on display 120. Device 100*a* overlays hat 160*d*, which is a virtual object generated by device 100*a*, on the head of the representation 170*a* of person 180*a*. Device 100*a* tracks the location and/or orientation of physical objects with respect to the position and/or orientation of device 100*a* to enable virtual objects to interact with physical objects from the real environment in the augmented reality environment. In this example, device 100*a* accounts for movements of device 100*a* and person 180*a* to display hat 160*d* as being on the head of the representation 170*a* of person 180*a*, even as device 100*a* and person 180*a* move relative to one another.

FIG. 1E illustrates device 100*a* carrying out a mixed reality technique, and in particular an augmented virtuality technique. Device 100*a* is displaying, on display 120, a virtual environment 160 with representations of physical objects. The virtual environment 160 includes virtual objects (e.g., sun 160*a*, birds 160*b*) and representation 170*a* of person 180*a*. For example, device 100*a* uses image sensor(s) 108 to capture images of person 180*a* in real environment 180. Device 100*a* places representation 170*a* of person 180*a* in virtual environment 160 for display on display 120. Device 100*a* optionally tracks the location and/or orientation of physical objects with respect to the position and/or orientation of device 100*a* to enable virtual objects to interact with physical objects from real environment 180. In this example, device 100*a* accounts for movements of device 100*a* and person 180*a* to display hat 160*d* as being on the head of representation 170*a* of person 180*a*. Notably, in this example, device 100*a* does not display a representation of tree 180*b* even though tree 180*b* is also within the field of view of the image sensor(s) of device 100*a*, in carrying out the mixed reality technique.

FIGS. 1F-1H illustrate examples of system 100 in the form of device 100*a*. In FIGS. 1F-1H, device 100*a* is a HMD device configured to be worn on the head of a user, with each eye of the user viewing a respective display 120*a* and 120*b*. FIG. 1F illustrates device 100*a* carrying out a virtual reality technique. Device 100*a* is displaying, on displays 120*a* and 120*b*, a virtual environment 160 that includes virtual objects, such as sun 160*a*, birds 160*b*, and beach 160*c*. The displayed virtual environment 160 and virtual objects (e.g., 160*a*, 160*b*, 160*c*) are computer-generated imagery. In this example, device 100*a* simultaneously displays corresponding images on display 120*a* and display 120*b*. The corresponding images include the same virtual environment 160 and virtual objects (e.g., 160*a*, 160*b*, 160*c*) from different viewpoints, resulting in a parallax effect that provides a user with the illusion of depth of the objects on the displays. Note that the virtual reality environment depicted in FIG. 1F does not include representations of physical objects from the real environment, such as person 180*a* and tree 180*b* even though person 180*a* and tree 180*b* are within the field of view of the image sensor(s) of device 100*a*, in carrying out the virtual reality technique.

FIG. 1G illustrates device 100*a* carrying out an augmented reality technique using pass-through video. Device 100*a* is displaying, on displays 120*a* and 120*b*, a representation 170 of real environment 180 with virtual objects. The representation 170 of real environment 180 includes representation 170*a* of person 180*a* and representation 170*b* of tree 180*b*. For example, device 100*a* uses image sensor(s) 108 to capture images of the real environment 180 that are passed through for display on displays 120*a* and 120*b*. Device 100*a* is overlaying a computer-generated hat 160*d* (a virtual object) on the head of representation 170*a* of person 180*a* for display on each of displays 120*a* and 120*b*. Device 100*a* tracks the location and/or orientation of physical objects with respect to the position and/or orientation of device 100*a* to enable virtual objects to interact with physical objects from real environment 180. In this example, device 100*a* accounts for movements of device 100*a* and person 180*a* to display hat 160*d* as being on the head of representation 170*a* of person 180*a*.

FIG. 1H illustrates device 100*a* carrying out a mixed reality technique, and in particular an augmented virtuality technique, using pass-through video. Device 100*a* is displaying, on displays 120*a* and 120*b*, a virtual environment 160 with representations of physical objects. The virtual environment 160 includes virtual objects (e.g., sun 160a, birds 160b) and representation 170a of person 180a. For example, device 100a uses image sensor(s) 108 to capture images of person 180a. Device 100a places the representation 170a of the person 180a in the virtual environment for display on displays 120a and 120b. Device 100a optionally tracks the location and/or orientation of physical objects with respect to the position and/or orientation of device 100a to enable virtual objects to interact with physical objects from real environment 180. In this example, device 100a accounts for movements of device 100a and person 180a to display hat 160d as being on the head of the representation 170a of person 180a. Notably, in this example, device 100a does not display a representation of tree 180b even though tree 180b is also within the field of view of the image sensor(s) 108 of device 100a, in carrying out the mixed reality technique.

FIG. 1I illustrates an example of system 100 in the form of device 100a. In FIG. 1I, device 100a is a HUD device (e.g., a glasses device) configured to be worn on the head of a user, with each eye of the user viewing a respective heads-up display 120c and 120d. FIG. 1I illustrates device 100a carrying out an augmented reality technique using heads-up displays 120c and 120d. The heads-up displays 120c and 120d are (at least partially) transparent displays, thus allowing the user to view the real environment 180 in combination with heads-up displays 120c and 120d. Device 100a is displaying, on each of heads-up displays 120c and 120d, a virtual hat 160d (a virtual object). The device 100a tracks the location and/or orientation of physical objects in the real environment with respect to the position and/or orientation of device 100a and with respect to the position of the user's eyes to enable virtual objects to interact with physical objects from real environment 180. In this example, device 100a accounts for movements of device 100a, movements of the user's eyes with respect to device 100a, and movements of person 180a to display hat 160d at locations on displays 120c and 120d such that it appears to the user that the hat 160d is on the head of person 180a.

Figure 2:
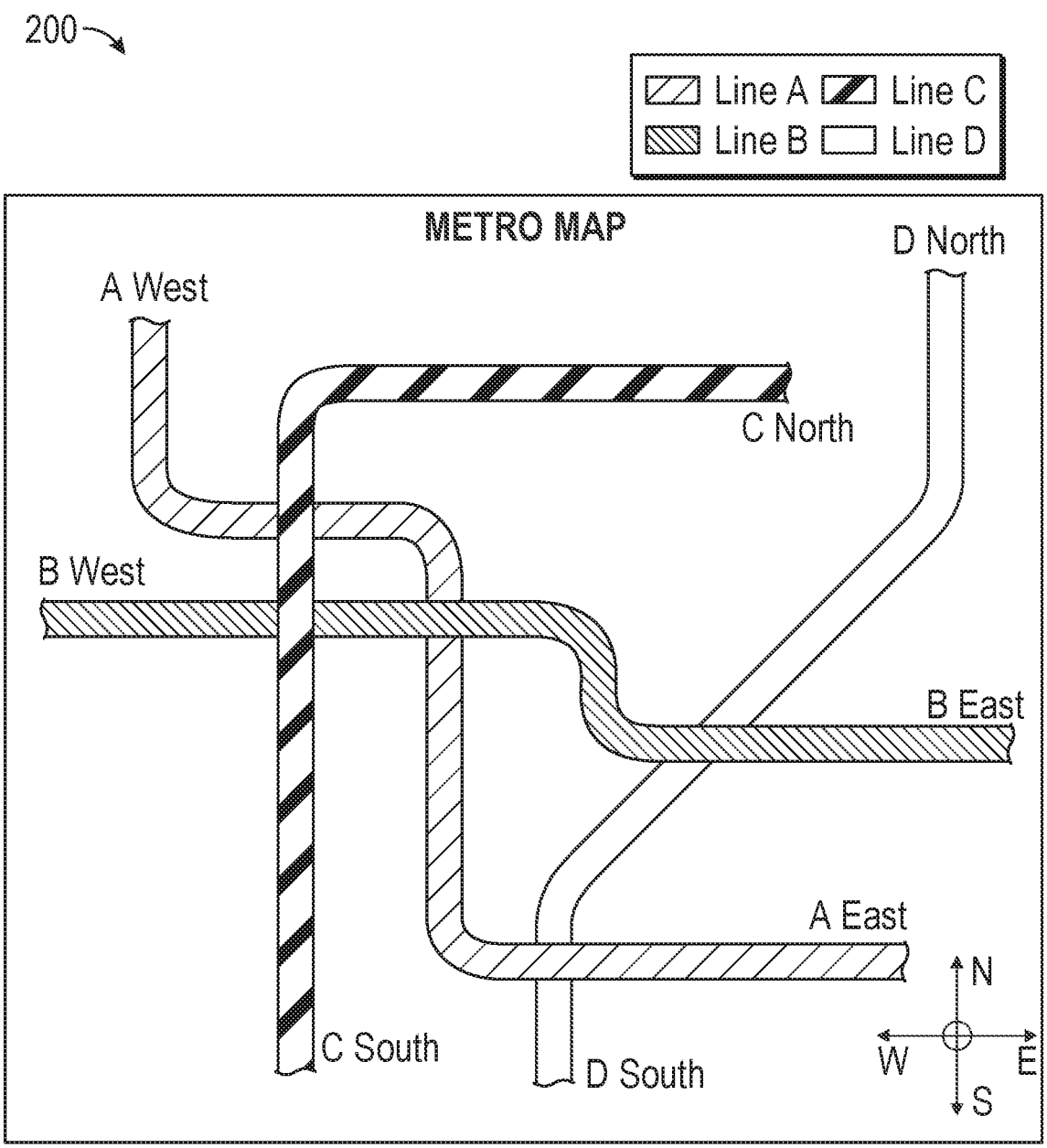
FIG. 2 illustrates an example of a physical map.

FIG. 2 illustrates an example of a physical map 200. Map 200 depicted in FIG. 2 illustrates an example of a light rail transit map, including the routes of four different rail lines (e.g., "Line A", "Line B", "Line C", and "Line D"). However, it should be understood that map 200 may be any type of map illustrating the layout and/or features of an area, such as a road map, topographical map, nautical map, and so on. Map 200 can be located at a predefined location, such as a transit station or stop. Map 200 can also include an identifier, such as text, a predefined symbol (e.g., a QR code), or other content identifying map 200 and/or a location of map 200.

Figure 3:
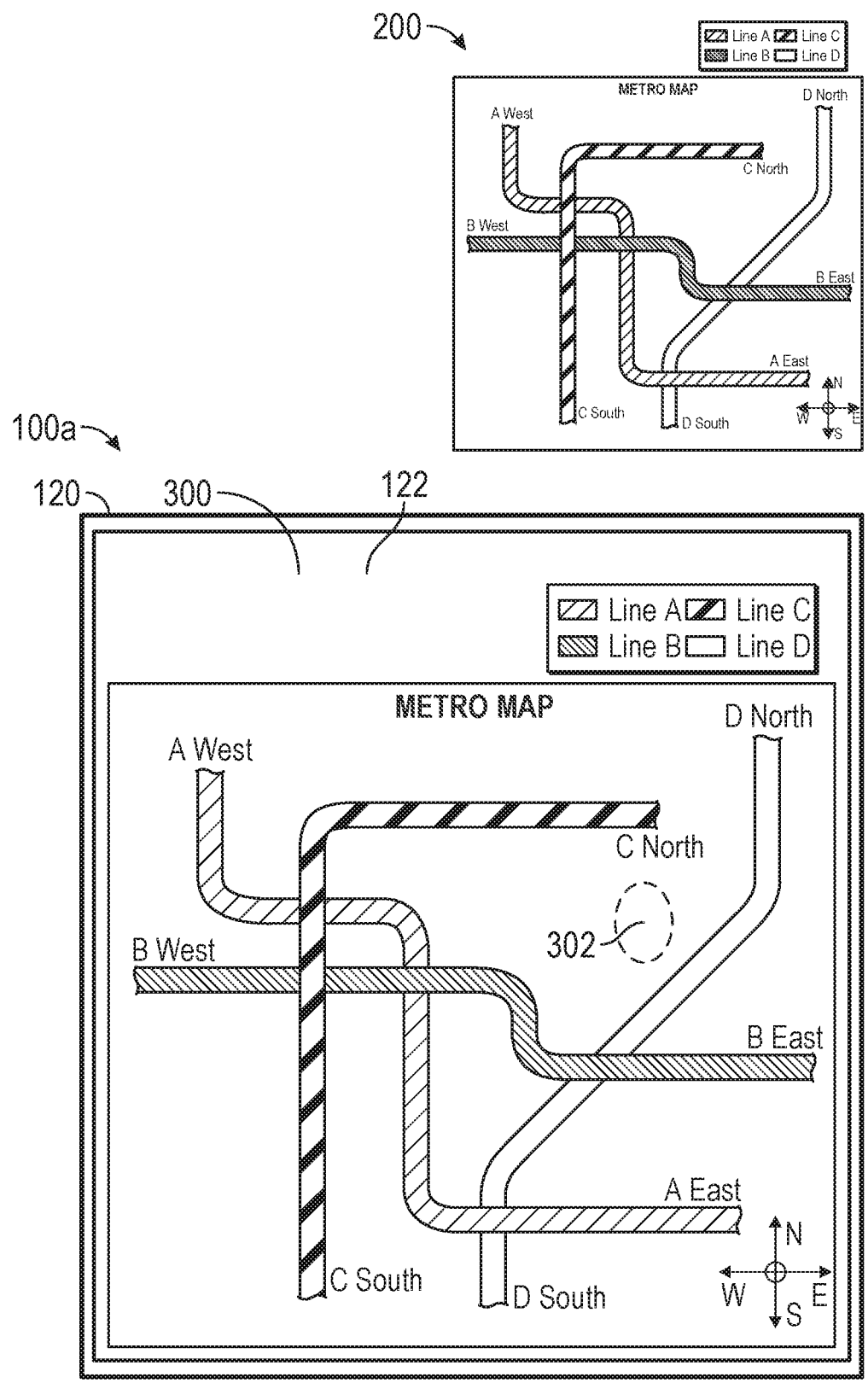
FIG. 3 illustrates an embodiment of a device displaying a representation of a map.

FIG. 3 illustrates an embodiment of device 100a displaying, on display 120, a representation 300 of map 200, meaning that an image sensor of device 100a is capturing live image(s) of map 200 and display 120 is displaying relevant captured image content. Device 100a is an embodiment of system 100, as described in reference to FIGS. 1A-1B. In FIG. 3, device 100a is shown as a mobile device, such as an electronic tablet. However, it should be understood that device 100a can be any device configured to display an augmented reality environment, such as the devices described in reference to FIGS. 1D, 1G, and 1I.

Device 100a uses one or more image sensors (such as image sensor(s) 108 described in reference to FIGS. 1A-1B) to capture images of map 200, which are passed through for display on display 120. In some embodiments, when device 100a detects that the captured images include a depiction of map 200, an affordance is displayed to indicate that the depiction of map 200 is detected, and that transit information associated with map 200 is available for display.

In some embodiments, device 100a receives a user input 302, such as a tap input, on touch-sensitive surface(s) 122. In some embodiments, user input 302 is at any location on the display 120 where the representation 300 of map 200 is being displayed. In some embodiments, user input 302 is at a location of an affordance indicating the availability of transit information associated with map 200 for display. In response to receiving user input 302, device 100a overlays the representation 300 of map 200 with transit information, as shown in FIGS. 4-6.

In some embodiments (such as with a HMD device or HUD device), device 100a detects user input 302 by tracking the position of a user's hand or finger. When the device 100a determines that the user's hand or finger touches or gestures toward the physical map 200, device 100a overlays the representation 300 of map 200 with transit information, as shown in FIGS. 4-6.

In some embodiments, device 100a automatically displays transit information in response to device 100a detecting the appearance of map 200 in images captured by device 100a (such as with image sensor(s) 108 described in reference to FIGS. 1A-1B). In some embodiments, device 100a detects the appearance of map 200 in the captured images by detecting other visual characteristics associated with map 200, such as predefined text on or near map 200, predefined symbols (such as a QR code) on or near map 200, and/or the location and orientation of content (such as text or images) on or near map 200.

Figure 4:
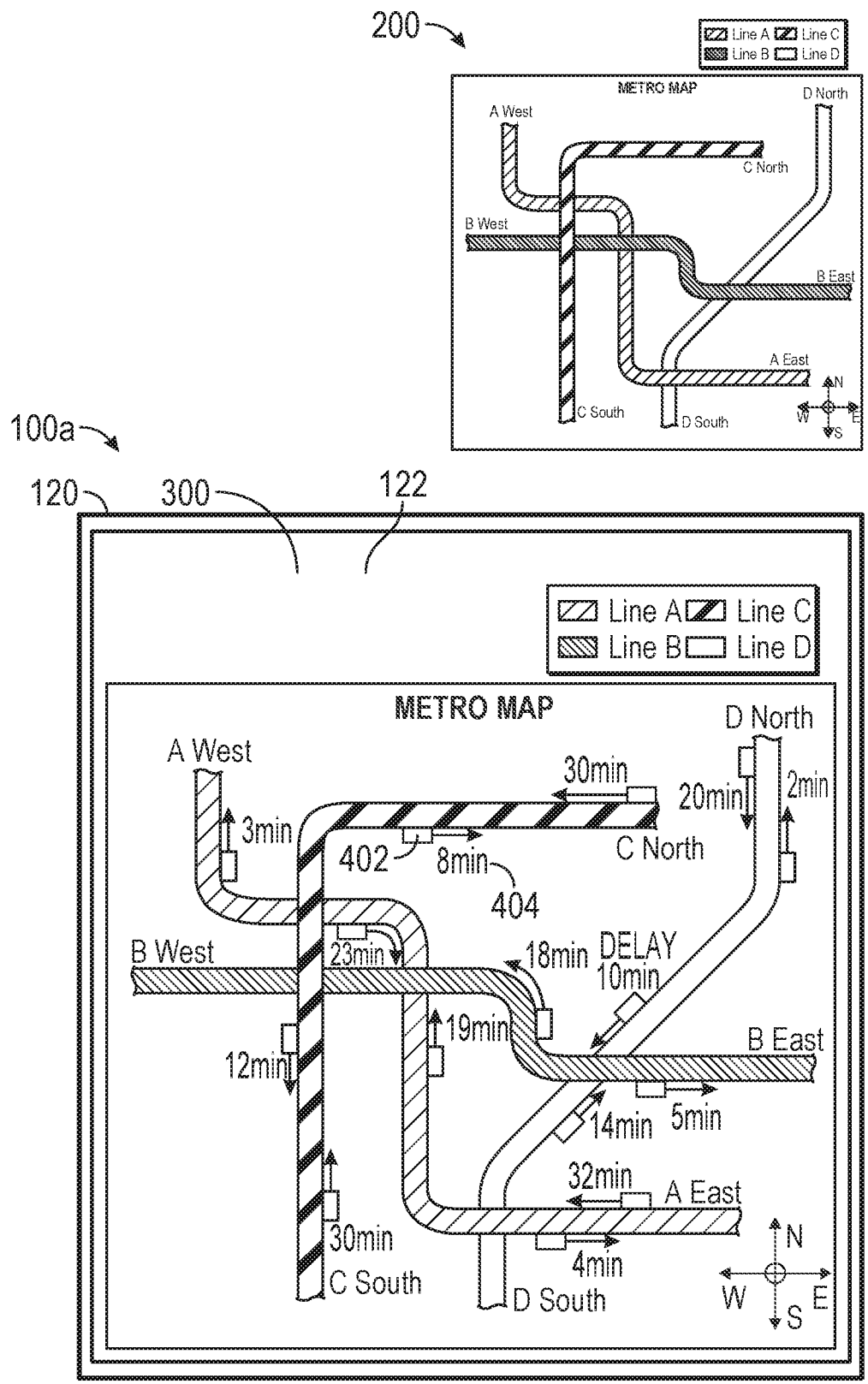
FIG. 4 illustrates an embodiment of a device displaying transit information overlaying the representation of the map.
Figure 5:
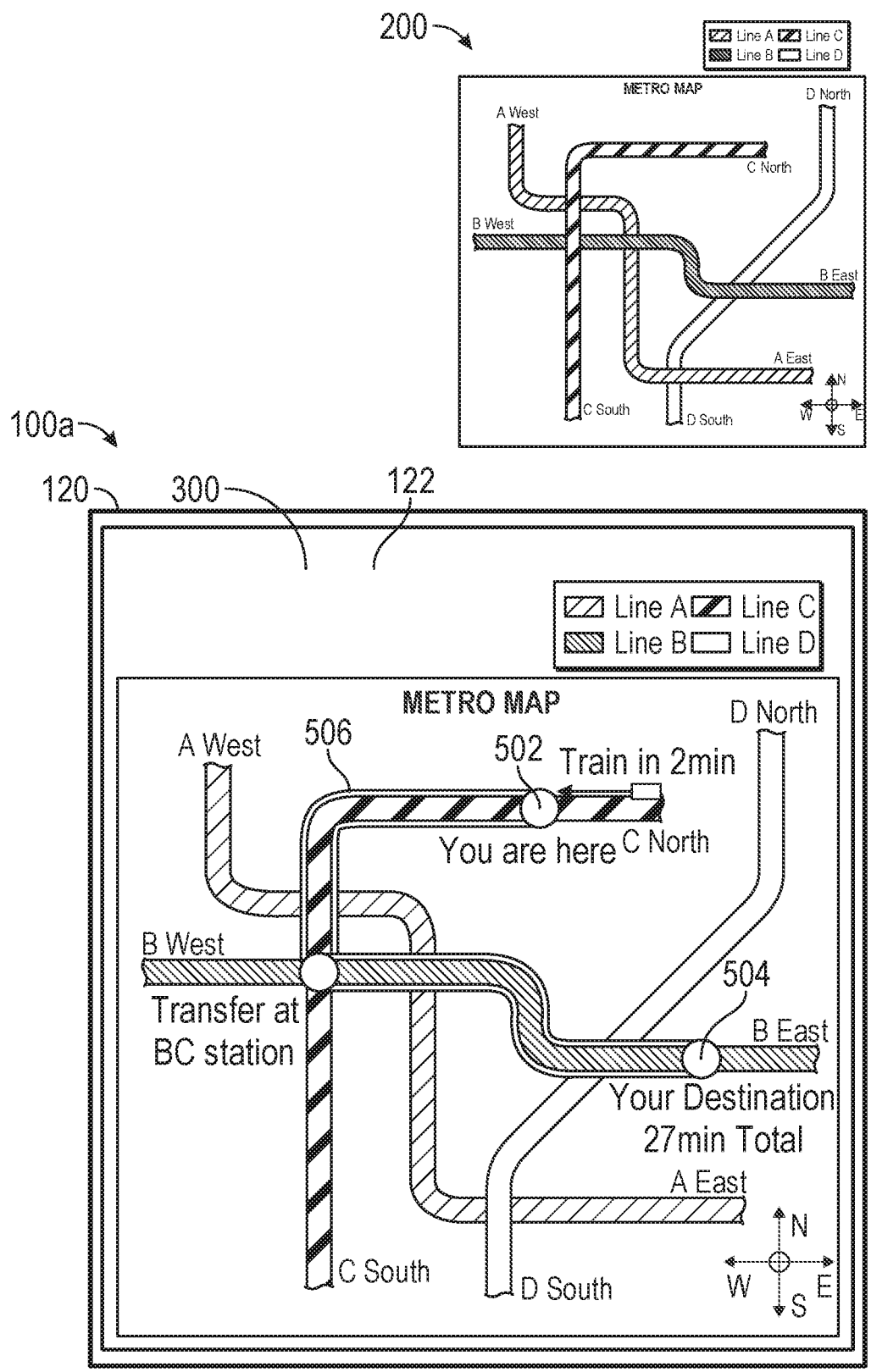
FIG. 5 illustrates an embodiment of a device displaying transit information overlaying the representation of the map.
Figure 6:
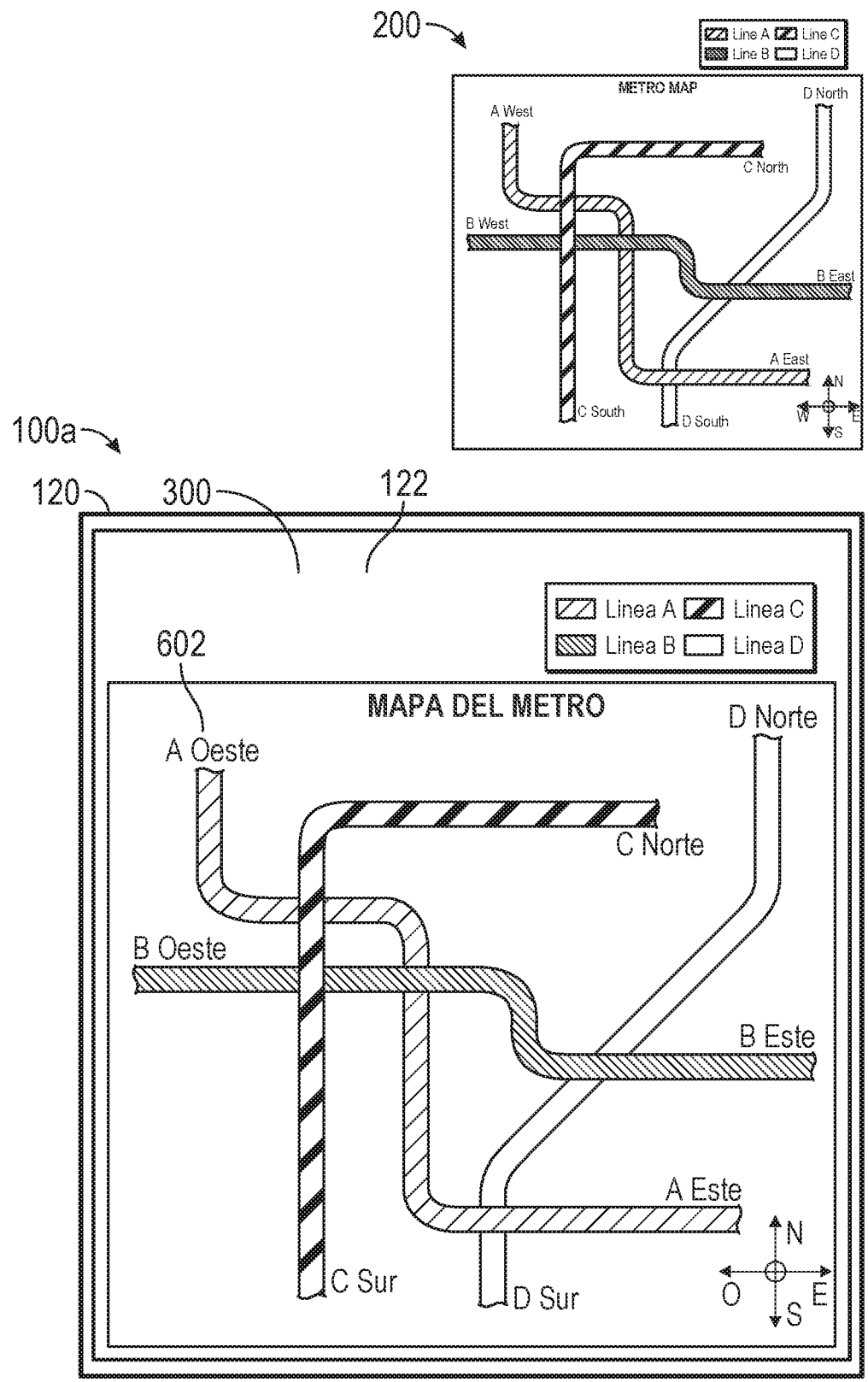
FIG. 6 illustrates an embodiment of a device displaying transit information overlaying the representation of the map.

FIGS. 4-6 illustrate embodiments of device 100a displaying, on display 120, transit information overlaying representation 300 of map 200. Device 100a is an embodiment of system 100, as described in reference to FIGS. 1A-1B. In FIGS. 4-6, device 100a is shown as a mobile device, such as an electronic tablet. However, it should be understood that device 100a can be any device configured to display an augmented reality environment, such as the devices described in reference to FIGS. 1D, 1G, and 1I.

As shown in FIG. 4, transit information includes the current location of transit vehicles (such as transit vehicle 402), and the approximate time of arrival (such as time 404) of each vehicle to its next stop. Transit vehicles may be trains, buses, ferries, or other vehicles with an established route shown on map 200. Device 100a tracks the position and/or orientation of map 200 with respect to the position and/or orientation of device 100a to enable the display of transit information overlaying the representation 300 of map 200. In this way, the transit information appears to replace or add to features (e.g., transit routes) included in the representation 300 of map 200 (e.g., representation 300 of map 200 is modified to include the transit information).

In some embodiments, transit information is displayed in response to device 100a receiving a user input (such as user input 302 described in reference to FIG. 3). In some embodiments, device 100a automatically displays transit information in response to device 100a detecting the appearance of map 200 in images captured by device 100a (such as with image sensor(s) 108 described in reference to FIGS. 1A-1B). In some embodiments, device 100a detects the appearance of map 200 in the captured images by detecting other visual characteristics associated with map 200, such as predefined text on or near map 200, predefined symbols (such as a QR code) on or near map 200, and/or the location and orientation of content (such as text or images) on or near map 200.

In some embodiments, before displaying transit information, device 100a determines whether map 200 is a predefined map (e.g., a map located at a predefined location, such as a transit station or stop). In some embodiments, map 200 includes an identifier, such as text, a predefined symbol (e.g., a QR code), or other content identifying map 200 as a predefined map. In response to determining that map 200 is a predefined map, device 100a provides transit information associated with the predefined map, such as the location of the predefined map and/or transit routes leading to/from the location.

In some embodiments, displayed transit information is modified in response to device 100a detecting a user interaction. In some embodiments, device 100a detects the user interaction when a user contacts touch-sensitive surface(s) 122. In some embodiments (such as with a HMD device or HUD device), device 100a detects the user interaction by tracking the position of a user's hand or finger. For example, when the device 100a determines that the user's hand or finger touches or gestures toward the physical map 200, device 100a interprets the touch or gesture as a user interaction.

In response to the user interaction, device 100a modifies the displayed transit information or provides different transit information. For example, if device 100a detects that the user interaction is a selection of transit vehicle 402, then device 100a provides additional information about the transit vehicle 402, such as a list of transit stops, arrival times, departure times, connecting routes, and the like. As another embodiment, if device 100a detects that the user interaction is a selection of transit stop, then device 100a provides additional information about the transit stop, such as arrival times, departure times, connecting routes, and the like.

In some embodiments, device 100a retrieves the transit information from one or more external data source(s), such as a data source associated with the transit service. In some embodiments, the external data source(s) provide the estimated time of arrival (such as time 404) of each transit vehicle (such as vehicle 402). In some embodiments, the external data source(s) also provide the approximate location of each transit vehicle (such as vehicle 402). In some embodiments, device 100a automatically retrieves the transit information in response to device 100a detecting the appearance of map 200 in images captured by device 100a (such as with image sensor(s) 108 described in reference to FIGS. 1A-1B). In some embodiments, device 100a automatically retrieves the transit information in response to detecting the location of device 100a is at or near map 200. In some embodiments, device 100a detects the location of device 100a with a global position system (GPS). In some embodiments, the device 100a detects the location of device 100a by recognizing physical features of the surrounding physical environment in images captured by device 100a.

As shown in FIG. 5, transit information optionally includes a current location 502 and a route 506 to a destination 504. Device 100a tracks the position and/or orientation of map 200 with respect to the position and/or orientation of device 100a to enable the display of transit information overlaying the representation 300 of map 200. In this way, the transit information appears to replace or add to features (e.g., transit routes) included in the representation 300 of map 200 (e.g., representation 300 of map 200 is modified to include the transit information).

In some embodiments, device 100a determines a current location of device 100a based on map 200 being a predefined map, such as a transit map at a particular location, as described in reference to FIG. 4. Alternatively or in addition, in some embodiments, device 100a determines a current location of device 100a based on a detected location of device 100a (e.g., location of device 100a is detected using GPS). Device 100a displays current location 502 at a position that is based on the current location of device 100a.

In some embodiments, device 100a determines destination 504 based on input indicating an intended destination. In some embodiments, the input indicating the intended destination is provided to device 100a by the user. In some embodiments, device 100a detects the input indicating the intended destination when a user contacts touch-sensitive surface(s) 122. For example, when device 100a detects a touch input at a position on display 120 corresponding to a location on map 200, then device 100a interprets the touch input as an input indicating the intended destination and displays destination 504 at a position corresponding to the intended destination. In some embodiments (such as with a HMD device or HUD device), device 100a detects the input indicating the intended destination by tracking the position of a user's hand or finger. For example, when the device 100a determines that the user's hand or finger touches or gestures toward a location on physical map 200, device 100a interprets the touch or gesture as an input indicating the intended destination and displays destination 504 at a position corresponding to the intended destination.

In some embodiments, the input indicating the intended destination is retrieved from (or provided by) other software or data storage accessible by device 100a (e.g., GPS navigation software). For example, when a desired destination is provided to other software, device 100a retrieves the desired destination from the other software, and displays destination 504 at a position corresponding to the desired destination.

In some embodiments, based on current location 502 and destination 504, a route 506 to destination 504 is provided as part of the transit information. In the example shown in FIG. 5, route 506 indicates which transit lines the user should take from current location 502 to destination 504. However, it should be understood that route 506 from current location 502 to destination 504 may indicate other forms of transit, such as walking, biking, or driving. In some embodiments, the transit information also indicates an estimated amount of time to reach destination 504.

As shown in FIG. 6, transit information includes a translation of the text depicted on physical map 200. Device 100a tracks the position and/or orientation of map 200 with respect to the position and/or orientation of device 100a to enable the display of transit information overlaying the representation 300 of map 200. In this way, the transit information appears to replace or add to features (e.g., text) included in the representation 300 of map 200 (e.g., representation 300 of map 200 is modified to include the transit information).

In some embodiments, device 100a identifies the language of the text depicted on map 200. In some embodiments, device 100a identifies the language of the text based on the physical location of map 200. For example, if map 200 is physically located at a transit stop in Germany, then device 100a determines, based on the location of the map, that the language of the text depicted on map 200 is German. In some embodiments, device 100a determines the physical location of map 200 based on map 200 being a predefined map, as described in reference to FIG. 4. Alternatively or in addition, in some embodiments, device 100a determines the physical location of map 200 based on a detected location of device 100a (such as with a global positioning system (GPS)).

In some embodiments, the text depicted on map 200 is translated based on a user preference. For example, if the user's preferred language is Spanish, device 100a translates the text of map 200 into Spanish and displays the translated text (such as text 602) on display 120 as part of the transit information. In some embodiments, device 100a provides one or more images of map 200 to a text recognition engine, which identifies the text depicted on map 200. In some embodiments, the text recognition engine provides the recognized text to a translation engine, which provides a translation of the recognized text. The text recognition engine and/or translation engine are optionally components of device 100a or remote from device 100a.

Figure 7:
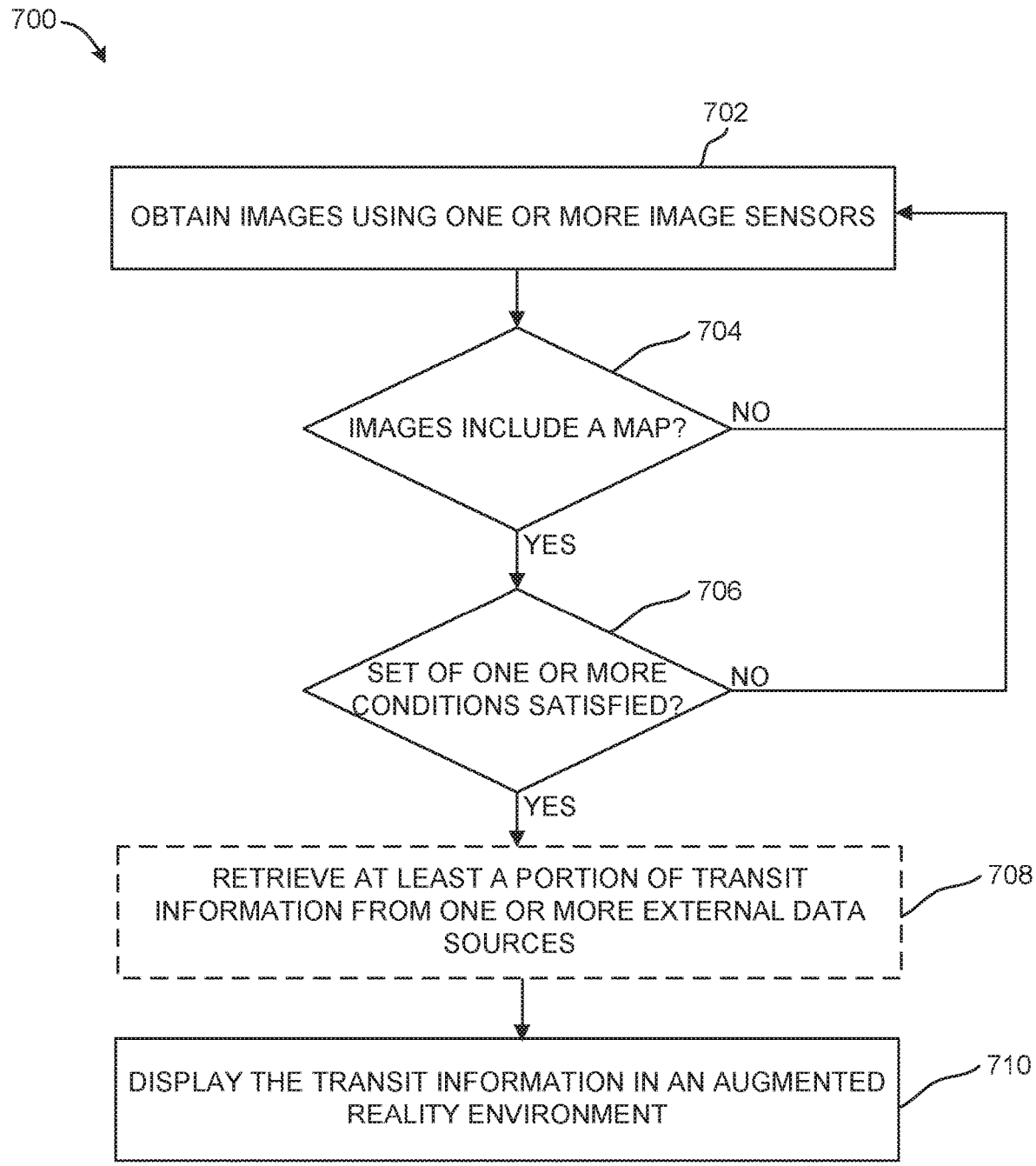
FIG. 7 illustrates an exemplary technique for providing transit information in an augmented reality environment.

FIG. 7 illustrates an exemplary technique 700 for providing transit information in an augmented reality environment. In some examples, the technique is carried out by system 100 described in reference to FIGS. 1A-6. At block 702, images are obtained using one or more image sensors (e.g., image sensor(s) 108 described in reference to FIGS. 1A-1B).

At block 704, a determination is made whether the obtained images include a map (e.g., map 200). If the obtained images include a map, then at block 706, a determination is made whether a set of one or more conditions is satisfied. The set of one or more conditions includes a condition that is satisfied when the obtained images include the map. In some embodiments, the set of one or more conditions include a second condition that is satisfied when the map corresponds to a predefined map. In some embodiments, the predefined map includes an identifier, such as text, a predefined symbol (e.g., a QR code), or other content identifying the map as a predefined map (e.g., the map includes an identifier identifying the location of the map). In some embodiments, the set of one or more conditions include a third condition that is satisfied when a user input (e.g., user input 302 described in reference to FIG. 3) is detected.

Optionally, at block 708, in accordance with the set of one or more conditions being satisfied, at least a portion of transit information is retrieved from one or more external data sources.

At block 710, in accordance with the set of one or more conditions being satisfied, the transit information is displayed in an augmented reality environment. A location of the displayed transit information in the augmented reality environment corresponds to a respective feature of the map (e.g., the displayed transit information overlays features of the physical map).

In some embodiments, the transit information includes a current location of a transit vehicle, a path to a destination, an estimated time of arrival of a transit vehicle, an estimated time of departure of a transit vehicle, a translation of map text, a price of transit, or a combination thereof.

In some embodiments, a physical location of an electronic device (e.g., device 100a) is determined, and the displayed transit information is based at least in part on the physical location of the electronic device (e.g., the displayed transit information includes a current location 502, as described in reference to FIG. 5). In some embodiments, at least a portion of the transit information is retrieved from one or more external data resources based at least in part on the physical location of the electronic device. In some embodiments, an intended destination (e.g., destination 504, described in reference to FIG. 5) is determined in response to a user interaction, and transit information is displayed based at least in part on the intended destination (e.g., the displayed transit information includes the destination 504 and a route to the destination 504).

While the present disclosure has been shown and described with reference to the embodiments provided herein, it will be understood by those skilled in the art that various changes in form and details may be made without departing from the scope of the present disclosure.

What is claimed is:

1. A device for providing transit information, comprising:
one or more processors; and
memory storing one or more programs configured to be executed by the one or more processors, the one or more programs including instructions for:
obtaining images of a real environment using one or more image sensors;
determining whether the obtained images include predefined content in the real environment;
in accordance with a set of one or more conditions being satisfied, the set of one or more conditions including a first condition that is satisfied when the obtained images include the predefined content;
retrieving transit information associated with a predefined map based on the predefined content;
determining a position and orientation of a physical map in the real environment with respect to a position and orientation of the device, the physical map corresponding to the predefined map associated with the transit information; and
presenting the transit information at least partially overlaying a view of the physical map based on the position and orientation of the physical map with respect to the position and orientation of the device.

2. The device of claim 1, wherein the set of one or more conditions include a second condition that is satisfied when a user input is detected.

3. The device of claim 1, further comprising:
in accordance with the set of one or more conditions being satisfied:
retrieving at least a portion of the transit information from one or more external data sources.

4. The device of claim 1, further comprising:
determining a physical location of an electronic device, wherein the transit information is based at least in part on the physical location of the electronic device.

5. The device of claim 4, further comprising:
retrieving at least a portion of the transit information from one or more external data resources based at least in part on the physical location of the electronic device.

6. The device of claim 1, further comprising:
receiving input representing an intended destination, wherein the transit information is based at least in part on the intended destination.

7. The device of claim 1, wherein the transit information includes a current location of a transit vehicle, a route to a destination, an estimated time of arrival of a transit vehicle, an estimated time of departure of a transit vehicle, a translation of map text, a price of transit, or a combination thereof.

8. The device of claim 1, wherein the physical map is a physical public transit map.

9. A non-transitory computer-readable storage medium storing one or more programs configured to be executed by one or more processors, the one or more programs including instructions for:
obtaining images of a real environment using one or more image sensors;
determining whether the obtained images include predefined content in the real environment;
in accordance with a set of one or more conditions being satisfied, the set of one or more conditions including a first condition that is satisfied when the obtained images include the predefined content:
retrieving transit information associated with a predefined map based on the predefined content;
determining a position and orientation of a physical map in the real environment with respect to a position and orientation of the device, the physical map corresponding to the predefined map associated with the transit information; and
presenting the transit information at least partially overlaying a view of the physical map based on the position and orientation of the physical map with respect to the position and orientation of the device.

10. The non-transitory computer-readable storage medium of claim 9, wherein the set of one or more conditions include a second condition that is satisfied when a user input is detected.

11. The non-transitory computer-readable storage medium of claim 9, further comprising:
in accordance with the set of one or more conditions being satisfied:
retrieving at least a portion of the transit information from one or more external data sources.

12. The non-transitory computer-readable storage medium of claim 9, further comprising:
determining a physical location of an electronic device, wherein the transit information is based at least in part on the physical location of the electronic device.

13. The non-transitory computer-readable storage medium of claim 12, further comprising:
retrieving at least a portion of the transit information from one or more external data resources based at least in part on the physical location of the electronic device.

14. The non-transitory computer-readable storage medium of claim 9, further comprising:
receiving input representing an intended destination, wherein the transit information is based at least in part on the intended destination.

15. The non-transitory computer-readable storage medium of claim 9, wherein the transit information includes a current location of a transit vehicle, a route to a destination, an estimated time of arrival of a transit vehicle, an estimated time of departure of a transit vehicle, a translation of map text, a price of transit, or a combination thereof.

16. The non-transitory computer-readable storage medium of claim 9, wherein the physical map is a physical public transit map.

17. A method for providing transit information, the method comprising:
obtaining images of a real environment using one or more image sensors;
determining whether the obtained images include predefined content in the real environment;
in accordance with a set of one or more conditions being satisfied, the set of one or more conditions including a first condition that is satisfied when the obtained images include the predefined content:
retrieving transit information associated with a predefined map based on the predefined content;
determining a position and orientation of a physical map in the real environment with respect to a position and orientation of the device, the physical map corresponding to the predefined map associated with the transit information; and
presenting the transit information at least partially overlaying a view of the physical map based on the position and orientation of the physical map with respect to the position and orientation of the device.

18. The method of claim 17, wherein the set of one or more conditions include a second condition that is satisfied when a user input is detected.

19. The method of claim 17, further comprising:
in accordance with the set of one or more conditions being satisfied:
retrieving at least a portion of the transit information from one or more external data sources.

20. The method of claim 17, further comprising:
determining a physical location of an electronic device, wherein the transit information is based at least in part on the physical location of the electronic device.

21. The method of claim 20, further comprising:
retrieving at least a portion of the transit information from one or more external data resources based at least in part on the physical location of the electronic device.

22. The method of claim 17, further comprising:
receiving input representing an intended destination, wherein the transit information is based at least in part on the intended destination.

* * * * *